Feb. 27, 1934.   H. E. MERRITT   1,948,795
WORM GEARING
Filed Oct. 13, 1931

INVENTOR
Henry Edward Merritt
BY
Eugene C. Stevens
ATTORNEY

Patented Feb. 27, 1934

1,948,795

UNITED STATES PATENT OFFICE 1,948,795

WORM GEARING

Henry Edward Merritt, Huddersfield, England, assignor of one-half to David Brown & Sons (Huddersfield), Limited, Huddersfield, England Application October 13, 1931, Serial No. 568,613
In Great Britain October 16, 1930

7 Claims. (Cl. 74—41)

The invention relates to worm gearing of the type in which the worm is parallel or helical in form, and it has for its object the attainment of a higher efficiency than can be obtained by worm gearing of known constructions or forms.

It is well known that the contact between the thread of a worm and the tooth of a mating worm wheel is theoretically line contact, although in practice this theoretical line becomes a narrow band owing to the elasticity of the materials employed.

It is further known that in the ordinary design of worm gear, employing a worm having helical straight-sided threads, the lines of contact extend substantially in a direction longitudinal with respect to the worm wheel teeth, and therefore occupy positions largely parallel to the direction of sliding.

I have found that, in order to reduce to a minimum the friction between the engaging surfaces of worm gearing when sliding under load, it is necessary so to design the tooth forms of the worm and wheel that the line of contact is substantially, and as nearly as possible, at right angles to the direction of relative sliding of the worm and wheel teeth.

According to my invention I obtain the desired result by so forming the worm threads that, on a selected section containing the radial centre-line of a thread, the normals to the thread surface intersect a straight line in a plane perpendicular to the axis of the worm and tangential to a cylinder approximately equal in diameter to the root diameter of the threads.

The section on which this condition is to be satisfied may in many cases be that containing the axis of the worm, but if desired it may be normal to the worm threads or at any other angle to the axis of the worm.

An embodiment of the invention is illustrated in

Fig. 1 of the accompanying drawing, which shows the conditions obtaining when the section containing the worm axis is chosen as a basis of design;

Figure 1:
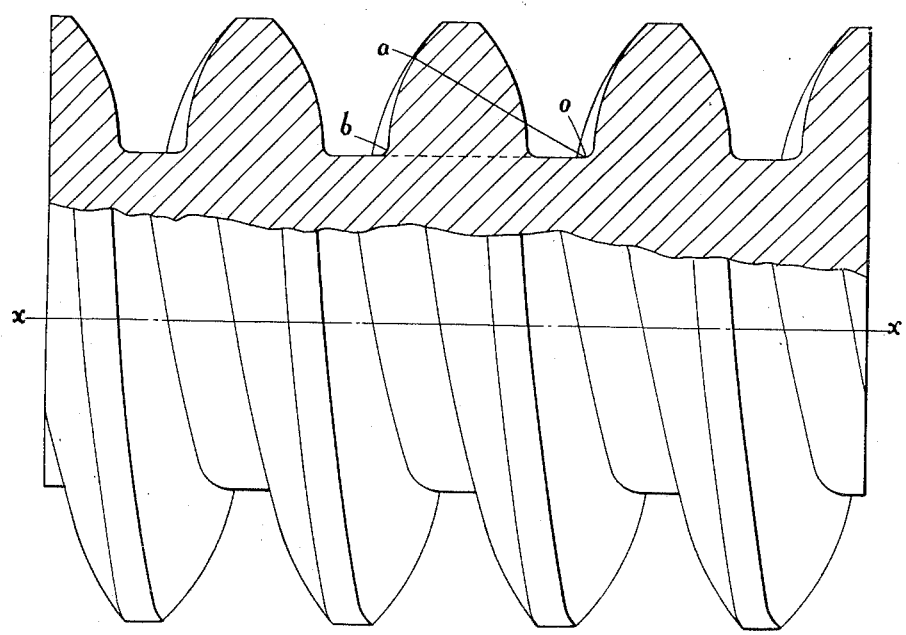

Referring to the drawing, the axial profile of the worm threads consists, in the example illustrated, of a circular arc $a$—$b$ having its centre at $o$ located approximately at the root of the threads. The normals to the thread surface at the points $a$ and $b$ are indicated respectively by the lines $a'$—$c$ and $b'$—$d$ in Fig. 2, the points $c$ and $d$ being the intersections of these normals with the line $o'$—$p'$ which is tangential to the circle passing through $o$, and in a plane perpendicular to the axis $x$—$x$ of the worm.

Figure 2:
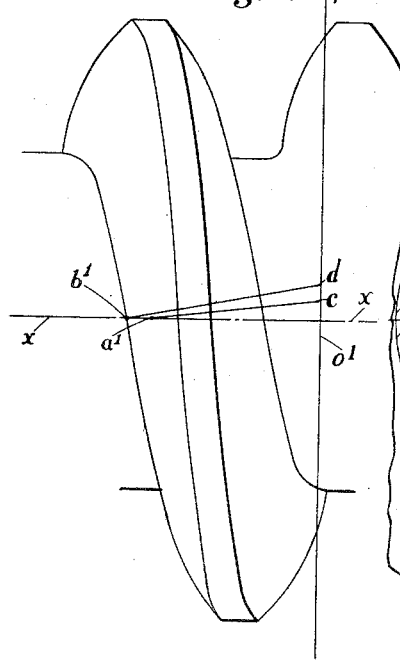
Fig. 2 is a plan view of a portion of the worm shown in Fig. 1.
Figure 3:
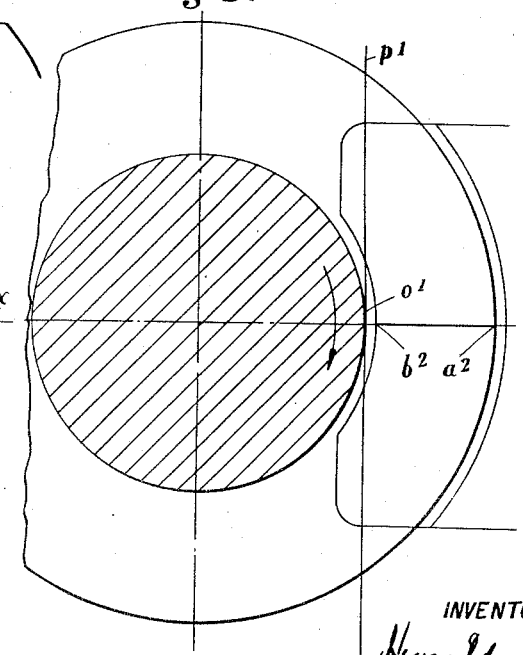
Fig. 3 is a diagrammatic transverse section of the worm in mesh with a tooth of a worm wheel.

If the pitch cylinder of the worm wheel is arranged to contain the line $o'$—$p'$, the contact will occur along the line $a'$—$b'$ in Fig. 2, or $a^2$—$b^2$ in Fig. 3, and this it will be observed is substantially at right angles to the direction of relative sliding of the engaging surfaces.

In the production of a worm of the form described, the threads may be milled or generated by means of a suitable cutter and subsequently profile ground by an abrasive wheel, each of appropriate form, and the worm wheel may be generated by means of a hob corresponding to the worm, in the usual way.

If desired for convenience in manufacture, the cutting edges of the cutter, or the profile of the grinding wheel, may be derived from a circular arc described in suitable relation to the axis or direction of motion of the cutter or wheel. The resulting profile of the worm threads will then differ by a small and determinable amount from the form of the cutter or abrasive wheel, whilst still possessing the contact characteristics which are the object of this invention.

Having thus described my invention, what I claim as new and desire to secure by Letters Patent is:—

1. Worm gearing, of the type having worm threads of helical form, characterized in that the worm threads and the teeth of the mating worm wheel are so formed in the manner herein set forth that the lines of contact between them are substantially at right angles to the direction of relative sliding of the worm and wheel tooth surfaces and continuously changing their position with respect to the teeth of the worm wheel.

2. Worm gearing of the type having worm threads of helical form, characterized in that the contour of a worm thread is such that on a section containing a radial centre-line of the thread the normals to the thread surface intersect a straight line in a plane perpendicular to the axis of the worm, the center of said line being located on a pitch plane.

3. Worm gearing, of the type having worm threads of helical form, characterized in that on a section containing the radial centre-line of a thread the thread profile is of uniform or substantially uniform curvature, the center of said curvature being located on a pitch plane.

4. Worm gearing, of the type having worm threads of helical form, wherein the profile of a worm thread on a plane containing the axis of the worm consists of a circular arc having its centre located on a pitch plane.

5. Worm gearing, of the type having worm threads of helical form, wherein the profile of a worm thread consists of a circular arc on a section normal to the helical centre-line of the threads, the center of said arc being located on a pitch plane.

6. Worm gearing of the type having worm threads of helical form, wherein the profiles of the worm threads are generated by a cutter or abrasive wheel the form of which is derived from a circular arc, the center of said arc being located on a pitch plane.

7. Worm gearing of the type having worm threads of helical form, wherein the profile of a worm thread consists of a circular arc on a section normal to the helical centre-line of the threads, said gearing having lines of contact substantially at right angles to the direction of sliding, contact occurring over substantially the whole length of the circular arc simultaneously, the center of said arc being located on a pitch plane.

HENRY EDWARD MERRITT.